United States Patent
Burillo et al.

(10) Patent No.: US 10,970,972 B2
(45) Date of Patent: Apr. 6, 2021

(54) WAGER REGISTRATION FOR AFTERMARKET BROKERED WAGERS

(71) Applicant: Hedgekings LLC, Key Biscayne, FL (US)

(72) Inventors: Eduardo Burillo, Key Biscayne, FL (US); Jeffrey Gross, Key Biscayne, FL (US)

(73) Assignee: HEDGEKINGS LLC, Key Biscayne, FL (US)

( * ) Notice: Subject to any disclaimer, the term of this patent is extended or adjusted under 35 U.S.C. 154(b) by 0 days.

(21) Appl. No.: 16/428,379

(22) Filed: May 31, 2019

(65) Prior Publication Data

US 2020/0380831 A1 Dec. 3, 2020

(51) Int. Cl.
| | | |
|---|---|---|
| *A63F 9/24* | (2006.01) | |
| *A63F 11/00* | (2006.01) | |
| *G06F 13/00* | (2006.01) | |
| *G06F 17/00* | (2019.01) | |
| *G07F 17/32* | (2006.01) | |
| *H04L 29/06* | (2006.01) | |

(52) U.S. Cl.
CPC ...... *G07F 17/3288* (2013.01); *G07F 17/3251* (2013.01); *H04L 63/0807* (2013.01)

(58) Field of Classification Search
USPC .............................. 463/1, 20, 22, 25, 39, 41
See application file for complete search history.

(56) References Cited

U.S. PATENT DOCUMENTS

| | | | |
|---|---|---|---|
| 2005/0171878 A1* | 8/2005 | Pennock | G06Q 40/00 705/35 |
| 2009/0023493 A1 | 1/2009 | Cheng et al. | |
| 2009/0313144 A1 | 12/2009 | Kadikar | |
| 2014/0274291 A1* | 9/2014 | Elias | G07F 17/34 463/20 |
| 2015/0228160 A1 | 8/2015 | Georgiopoulos et al. | |
| 2017/0221308 A1 | 8/2017 | Lakhotia | |

FOREIGN PATENT DOCUMENTS

CN 108596816 9/2018

\* cited by examiner

*Primary Examiner* — Adetokunbo O Torimiro
(74) *Attorney, Agent, or Firm* — Steven M. Greenberg, Esq.; Shutts & Bowen LLP

(57) ABSTRACT

Embodiments of the present invention provide a method, system and computer program product for a wager registration for aftermarket brokered wagers. A wager registration method for aftermarket brokered wagers includes receiving from an initial bettor in an aftermarket brokered wager computing system a digital image of a physical wager established with a purveyor of wagers independent of the aftermarket brokered wager computing system. The method additionally includes validating an authenticity of the digital image and responsive to the validation, writing a record to a registry indicating one hundred percent (100%) ownership of the wager by the bettor at an amount and odds indicated by the image. The method yet further includes confirming the record upon receipt of the physical wager and subsequently updating the record in the registry to indicate only a fractional ownership of the wager responsive to a third-party aftermarket buyer purchasing a fractional share of the wager.

21 Claims, 2 Drawing Sheets

WAGER REGISTRATION FOR AFTERMARKET BROKERED WAGERS

BACKGROUND OF THE INVENTION

Field of the Invention

The present invention relates to the field online wagering and bet brokering and more particularly to secondary markets for trading online wagers.

Description of the Related Art

Online wagering, also known as online gambling, has existed in several forms for several decades. Generally speaking, online wagering refers to the placement of wagers or bets through a computer interface by way of a remote automated process over a computer communications network such as the global Internet. Online wagering supports many different types of gambling activities including games of chance—particularly card and dice games, online virtual slot machines, pari-mutuel contests and sports wagering. In connection with sports wagering, individual gamblers may directly place bets with a centralized sports book, or the individual gamblers may indirectly place bets through a clearing house in which bets are brokered—so called bet brokering operations.

In general, in the context of sports gambling, a wager is placed in consideration of a cash payment and in connection with a prediction of a specific contingency—an occurrence of an event such as a particular individual or team winning or losing a particular competition, a particular score resulting from a particular competition, or a number or frequency of actions or outcomes that occur during the course of a particular competition. Indeed, sports gambling is not limited to sporting events as wagers likewise can be place on nearly any contest such as a political contest, or an artistic performance. Irrespective of the nature of the contingency of a wager, in most instances, the wager is purchased by the bettor providing funds to the facilitator of the bet, in consequence of which the bettor receives a document, electronic or physical, that specifies the contingency of the wager and the odds associated with the wager.

Of course, to the extent that the wager is placed through a middleman, a small portion of the wager is reserved as a commission for the middleman. Importantly, as it is widely understood, the odds associated with a wager once placed, may change depending upon external circumstances which may influence the probability of the outcome of the wager. As well, the odds associated with a wager may fluctuate depending upon the volume and nature of other wagers placed upon the same criteria by other betters indicating a crowd-sourced mentality of the probability of the associated contingency occurring.

Notably, for a single wager, for most bettors, once the wager has been purchased, no changes are required and the bettor may simply await the outcome to learn of the better has lost the wager, or if the better has won the wager. But, for some wagers, the comfort level of holding particular wagers can vary. To wit, in some instances, a bettor may feel overextended with too many wagers in play, whereas in other instances, the better may lose confidence in a particular wager where the odds have changed for the particular wager since the acquisition of the wager. However, once the wager has been placed, little can be done aside from seeking private secondary market transactions of the complete wager aimed at the sale of the entire wager to a purchaser willing to pay either a premium or a discounted rate for an existing wager depending upon the differential between the odds at the time of acquisition of the wager and the time of resale.

BRIEF SUMMARY OF THE INVENTION

Embodiments of the present invention address deficiencies of the art in respect to the aftermarket brokering of wagers and provide a novel and non-obvious method, system and computer program product for a wager registration for aftermarket brokered wagers. In an embodiment of the invention a wager registration method for aftermarket brokered wagers includes receiving from an initial bettor in an aftermarket brokered wager computing system, from over a computer communications network, a digital image of a physical wager established with a purveyor of wagers independent of the aftermarket brokered wager computing system. The method additionally includes validating an authenticity of the digital image and responsive to the validation, writing a record to a registry in the aftermarket brokered wager computing system indicating one hundred percent (100%) ownership of the wager by the bettor at an amount and odds indicated by the image. The method yet further includes confirming the record in the registry upon receipt of the physical wager and subsequently updating the record in the registry to indicate only a fractional ownership of the wager responsive to a third-party aftermarket buyer purchasing a fractional share of the wager.

In one aspect of the embodiment, the validation of the authenticity of the digital image includes recognizing an indicator within the digital image, transmitting a textual form of the indicator over the computer communications network to a validation service of the purveyor of wagers and receiving from the validation service, an indication of authenticity of the digital image. In another aspect of the embodiment, the validation of the authenticity of the digital image includes detecting a watermark of the purveyor of wagers within the digital image. In yet another aspect of the embodiment, the confirmation of the record upon receipt of the physical wager includes acquiring a contemporaneous image of the received physical wager, and comparing the contemporaneous image with the digital image received from the bettor to confirm that the digital image received from the bettor is an image of the received physical wager. In even yet another aspect of the embodiment, the method additionally includes acquiring a contemporaneous image of the received physical wager, and transmitting over the computer communications network to the validation service the contemporaneous image indicating physical possession of the physical wager, transmitting over the computer communications network to the initial better the contemporaneous image indicating physical possession of the physical wager, or both.

In another embodiment of the invention, a data processing system is configured for suggesting aftermarket brokered wagers. The system includes a host computing system having one or more computers, each with memory and at least one processor. The system includes a data storage device storing a database of subscribers and wagers and an aftermarket brokered wager computing system adapted to receive registration requests by different ones of the subscribers buying and selling wagers to one another and to respond to the requests by writing to the database records indicating ownership of the different wagers. Finally, the system includes a wager registration engine.

The engine includes computer program instructions executing in the memory of the host computing system, enabled to receive from an initial bettor in the aftermarket brokered wager computing system, from over the computer communications network, a digital image of a physical wager established with a purveyor of wagers independent of the aftermarket brokered wager computing system. The instructions are further enabled to validate an authenticity of the digital image and to respond to the validation by writing a record to a registry in the aftermarket brokered wager computing system indicating one hundred percent (100%) ownership of the wager by the bettor at an amount and odds indicated by the image. The instructions are yet further enabled to confirm the record in the registry upon receipt of the physical wager and to subsequently update the record in the registry to indicate only a fractional ownership of the wager responsive to a third-party aftermarket buyer purchasing a fractional share of the wager.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for wager registration in an aftermarket brokered wager. In accordance with an embodiment of the invention, a subscriber to an aftermarket wager brokering system captures an image of a physical document reflecting a wholly owned, wager acquired from an originator of wagers. The captured image is then provided over a computer communications network to a computing system of the aftermarket brokered wager computing system of a wager broker, and the physical document is mailed to a physical address of the wager broker. Upon receipt of the physical document, an image is captured of the physical document and compared to the received captured image to ensure that the physical document is the source of both images, and the captured image is further validated with the originator to ensure the authenticity of the wager. Upon validation, a record is written in the aftermarket brokered wager computing system indicating complete ownership of the wager by the subscriber and the wager is published for partial resale in the aftermarket wager brokering system. Upon partial resale of the wager, the record is modified to indicate that the subscriber owns less than the complete wager and only a fractional portion of the wager.

Figure 1:
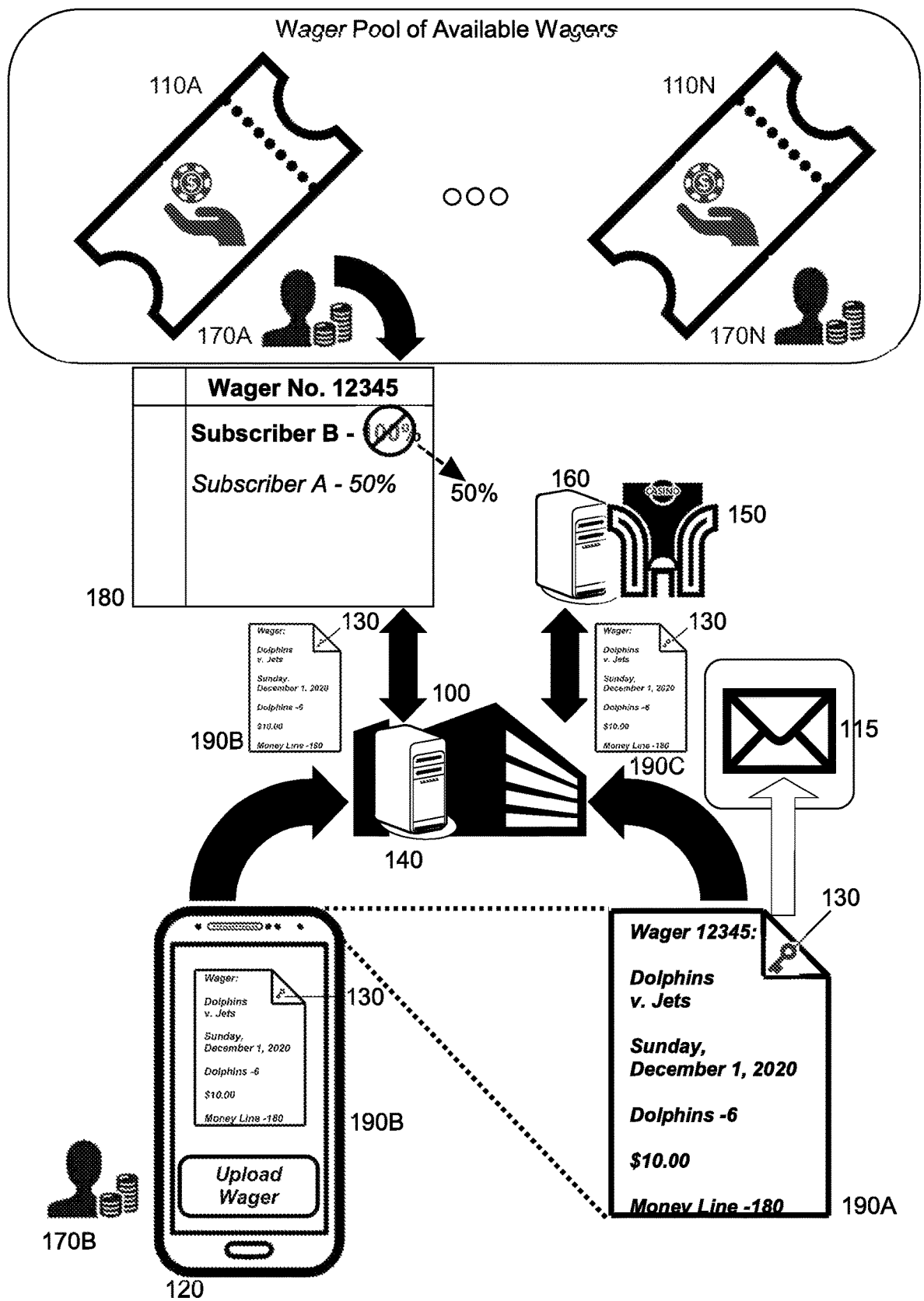
FIG. 1 is a pictorial illustration of a process for wager registration in an aftermarket brokered wager computing system.

In further illustration, FIG. 1 pictorially shows a process for wager registration in an aftermarket brokered wager computing system. As shown in FIG. 1, a subscriber 170B, amongst a multiplicity of subscribers 170A, 170B, 170N to a wager brokerage 100 utilizes a computing device 120 such a personal computer, tablet computer or smartphone, to capture a digital image 190B of a physical document 190A indicative of a wager of which the subscriber 170B owns 100%. Optionally, the physical document 190A includes a security feature 130 such as a watermark. Once the digital image 190B has been acquired, the subscriber 170B uploads the digital image 190B to an aftermarket brokered wager computing system 140 managed by the wager brokerage 100. As well, the subscriber mails or otherwise conveys the physical document 190A within a package or mailer 115 to a physical address of the wager brokerage 100.

Upon receipt of the digital image 190B, the aftermarket brokered wager computing system 140 process the digital image 190B to extract therefrom wager data such as the nature of the wager, the odds, and amount wagered. The aftermarket brokered wager computing system 140 then writes a temporary record 180 in memory indicating the wager data and also an identity of the subscriber 170B as 100% owner of the underlying wager reflected by the digital image 190. Importantly, the record 180 indicates an unverified state. Thereafter, as the package or mailer 115 is received at the physical address of the broker 100, the physical document 190A is then imaged into digital image 190C and digital image 190C is then compared to the previously received digital image 190B to ensure that both of the digital images 190B, 190C are of the same, physical document 190A.

As well, the physical document 190A is validated with an originator 150 of the underlying wager of the physical document 190A. In this regard, the digital image 190C may be electronically transmitted to a computing server 160 of the originator 150 so that the originator 150 may validate the authenticity of the wager data reflected therein. Optionally, the security feature 130 may be detected in the computing server 160 of the originator so as to indicate the authenticity of the physical document 190A. Alternatively or in addition, a hash value included as part of the security feature 130 may be compared to a hash value of the wager data to ensure that none of the wager data has been changed since the physical document 190A had been issued by the originator 150. In either case, the computing server 160 records a record indicating custodianship of the physical document 190A with the wager brokerage 100.

Once the physical document 190A is validated in the computing server 160 of the originator 150, the computing server 160 transmits a validation message to the aftermarket brokered wager computing system 140 which in turn, modifies the record 180 to indicate the validation of the wager data of the digital image 190A and the physical document 190A. Consequently, the aftermarket brokered wager computing system 140 publishes the wager data of the record 180 as a wager 110A, 110N available for portion aftermarket purchase. Once a different one of the subscribers 170A, 170N to the aftermarket brokered wager computing system 140 elects to purchase a partial share in the wager of the record 180, the aftermarket brokered wager computing system 140 receives payment from the different one of the subscribers 170A, 170N for the benefit of subscriber 170B and modifies the record 180 to indicate partial ownership of the wager as between the subscriber 170B and the different one of the subscribers 170A, 170N.

Figure 2:
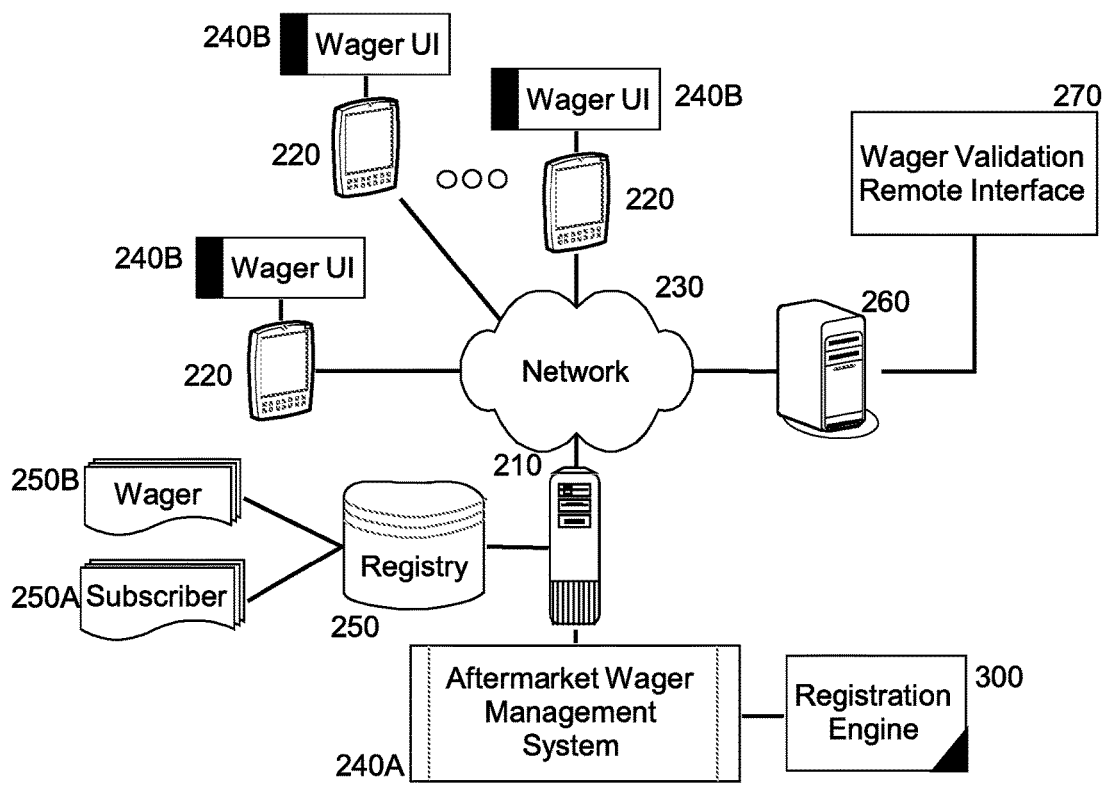
FIG. 2 is a schematic illustration of an aftermarket brokered wager data processing system configured to register a wager; and, FIG. 3 is a flow chart illustrating a process for wager registration in an aftermarket brokered wager computing system.

The process described in connection with FIG. 1 may be implemented in a computer data processing system. In further illustration, FIG. 2 schematically shows a data processing system configured to register a wager in an aftermarket brokered wager. The system includes a host computing platform 210 that includes one or more computers, each with memory and at least one processor. The host computing platform 210 supports the operation of an aftermarket wager management system 240A coupled to a registry 250 of existing wager records 250B reflecting wagers held by different registered subscribers 250A. The aftermarket wager management system 240A permits the subscribers 250A to re-sell ones of the wagers reflected by a corresponding one of the wager records 250B to one another from over a computer communications network 230 through respectively different mobile computing devices 220 each sporting a user interface 240B to the aftermarket wager management system 240A.

Notably, a registration engine 300 is coupled to the aftermarket wager management system 240A. The registration engine 300 includes computer program instructions that when executing in the memory of the host computing platform 210, are enabled to receive from one of the subscribers 250A registered in the registry 250, through the wager user interface 240B of a corresponding mobile computing device 220 of the one of the subscribers 250A, a digital image of a wager document. The program code is additionally enabled to extract from the digital image, wager data for a wager encapsulated within the wager document and to write a new one of the wager records 250B in the registry 250.

The program code yet further is enabled to provide the digital image over computer communications network 230 by way of a wager validation remote interface 270 to a remote server 260 of an originator of the wager. In this regard, the digital image provided through the wager validation remote interface 270 may be the same digital image received from the one of the subscribers 250A, or the digital image may be a different digital image captured for the wager document. In either circumstance, a validation response may be received from the wager validation remote interface 270 in the registration engine 300 indicative of the validity and authenticity of the wager and underlying wager document. Optionally, the content of the wager document may be further authenticated either remotely in the remote server 260, or locally by the registration engine 300 by comparing an embedded hash value in the wager document to a hash value computed for the wager data of the wager document so as to demonstrate the absence of tampering with the wager document. Once the wager document is validated by the remote server 260 of the originator of the wager, the new one of the wager records 250B is modified to indicate the validation of the new one of the wager records 250B. As such, the program code is enabled to publish a new wager for viewing in each of the wager user interfaces 240B as being available for a fractional purchase.

Figure 3:
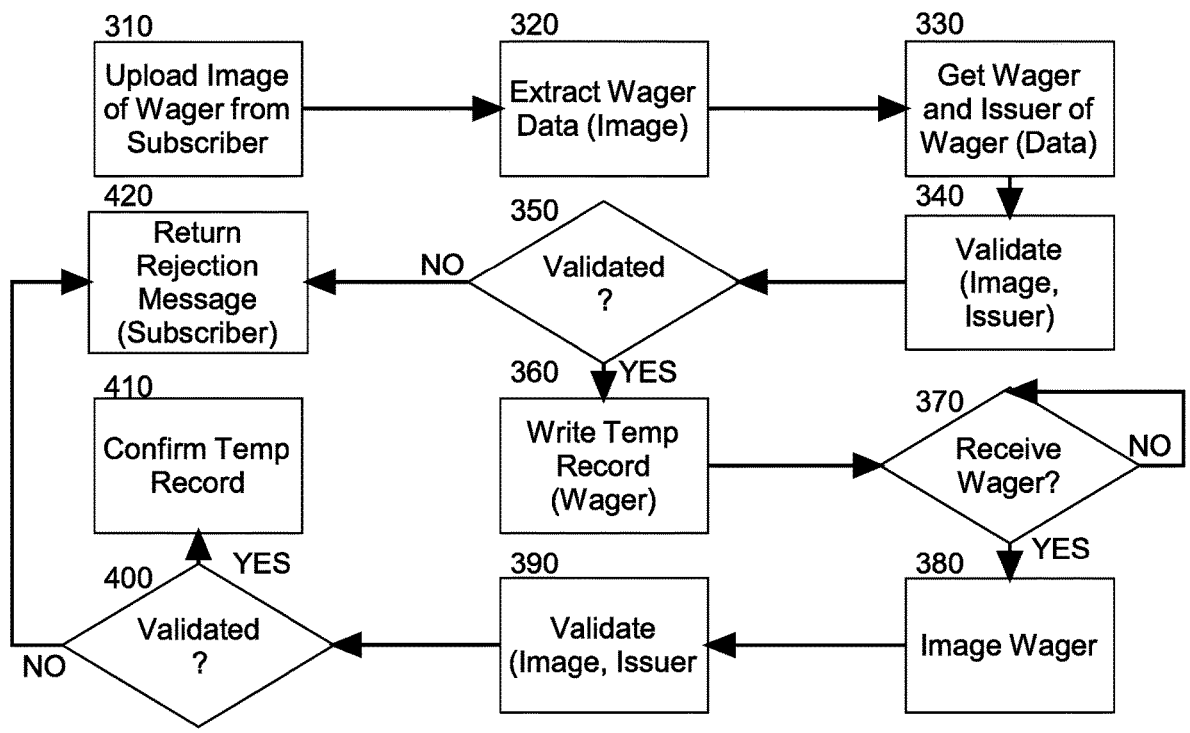

In even yet further illustration of the operation of the registration engine 300, FIG. 3 is a flow chart illustrating a process for wager registration in an aftermarket brokered wager. Beginning in block 310, a digital image of a wager document is received in memory of a host computing system from a computing device of a subscriber. In block 320, wager data is extracted from the digital image, such as by way of optical character recognition of a body of text present in the digital image, followed by keyword recognition of labels in the wager document according to a glossary of wager terms and matching according to corresponding values for each of the labels. To that end, in block 330, an issuer or originator of the wager is determined from the body of text along with the identity of the specific wager and the terms of the wager.

In block 340, the digital image of the wager is validated. In this regard, if a security feature is detected in the digital image the digital image is considered validated. Alternatively, or in addition, a hash value may be computed for the body of text or a portion thereof, and compared to a hash value embedded in the digital image so as to indicate, when identical, that no tampering or modification of the wager document or digital image of the wager document has occurred. In decision block 350, if the digital image fails to validate, in block 420 a rejection message is transmitted to the computing device of the subscriber. Otherwise, the process continues at block 360.

In block 360, a temporary record is written for the wager data, but annotated as not yet validated with the issuer. Thereafter, in decision block 370 it is determined whether or not the underlying wager document has been received. Upon receipt of the wager document, in block 380 a new image of the wager document is captured and in block 390, the new image is validated with the issuer. For instance, a network address for the issuer is determined by way of a query to a table and a request generated in accordance with a published application programming interface (API) for the issuer as recorded in the table. The request is generated to include a copy of the digital image or a newly captured image of a physical form of the wager document, along with the wager data extracted from the digital image or the newly captured image. The request is then transmitted to the issuer at the network address. In decision block 400, if the digital image fails to validate, in block 420 a rejection message is transmitted to the computing device of the subscriber. Otherwise, the temporary record is confirmed as valid in block 410.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A wager registration method for aftermarket brokered wagers comprising:
   receiving from an initial bettor in an aftermarket brokered wager computing system, from over a computer communications network, a digital image of a physical wager established with a purveyor of wagers independent of the aftermarket brokered wager computing system;
   validating an authenticity of the digital image and responsive to the validation, writing a record to a registry in the aftermarket brokered wager computing system indicating one hundred percent (100%) ownership of the wager by the bettor at an amount and odds indicated by the image;
   confirming the record in the registry upon receipt of the physical wager; and,
   subsequently updating the record in the registry to indicate only a fractional less than 100% ownership of the wager responsive to a third-party aftermarket buyer purchasing a fractional share of the wager.

2. The method of claim 1, wherein validating the authenticity of the digital image comprises recognizing an indicator within the digital image, transmitting a textual form of the indicator over the computer communications network to a validation service of the purveyor of wagers and receiving from the validation service, an indication of authenticity of the digital image.

3. The method of claim 1, wherein validating the authenticity of the digital image comprises detecting a watermark of the purveyor of wagers within the digital image.

4. The method of claim 1, wherein confirming the record upon receipt of the physical wager comprises acquiring a contemporaneous image of the received physical wager, and comparing the contemporaneous image with the digital image received from the bettor to confirm that the digital image received from the bettor is an image of the received physical wager.

5. The method of claim 1, further comprising publishing to a Web site, each written record indicating one hundred percent (100%) ownership of a corresponding wager.

6. The method of claim 2, further comprising acquiring a contemporaneous image of the received physical wager, and transmitting over the computer communications network to the validation service the contemporaneous image indicating physical possession of the physical wager.

7. The method of claim 2, further comprising acquiring a contemporaneous image of the received physical wager, and transmitting over the computer communications network to the initial better the contemporaneous image indicating physical possession of the physical wager.

8. A data processing system configured for wager registration for aftermarket brokered wagers, the system comprising:
- a host computing system comprising one or more computers, each with memory and at least one processor;
- a data storage device storing a database of subscribers and wagers;
- an aftermarket brokered wager computing system adapted to receive registration requests by different ones of the subscribers buying and selling wagers to one another and to respond to the requests by writing to the database records indicating ownership of the different wagers; and,
- a wager registration engine comprising computer program instructions executing in the memory of the host computing system and enabled to perform:
- receiving from an initial bettor in the aftermarket brokered wager computing system, from over a computer communications network, a digital image of a physical wager established with a purveyor of wagers independent of the aftermarket brokered wager computing system;
- validating an authenticity of the digital image and responsive to the validation, writing a record to a registry in the aftermarket brokered wager computing system indicating one hundred percent (100%) ownership of the wager by the bettor at an amount and odds indicated by the image;
- confirming the record in the registry upon receipt of the physical wager; and,
- subsequently updating the record in the registry to indicate only a fractional less than 100% ownership of the wager responsive to a third-party aftermarket buyer purchasing a fractional share of the wager.

9. The system of claim 8, wherein validating the authenticity of the digital image comprises recognizing an indicator within the digital image, transmitting a textual form of the indicator over the computer communications network to a validation service of the purveyor of wagers and receiving from the validation service, an indication of authenticity of the digital image.

10. The system of claim 8, wherein validating the authenticity of the digital image comprises detecting a watermark of the purveyor of wagers within the digital image.

11. The system of claim 8, wherein confirming the record upon receipt of the physical wager comprises acquiring a contemporaneous image of the received physical wager, and comparing the contemporaneous image with the digital image received from the bettor to confirm that the digital image received from the bettor is an image of the received physical wager.

12. The system of claim 8, wherein the program instructions are further enabled to perform publishing to a Web site, each written record indicating one hundred percent (100%) ownership of a corresponding wager.

13. The system of claim 9, wherein the program instructions are further enabled to perform acquiring a contemporaneous image of the received physical wager, and transmitting over the computer communications network to the validation service the contemporaneous image indicating physical possession of the physical wager.

14. The system of claim 9, wherein the program instructions are further enabled to perform acquiring a contemporaneous image of the received physical wager, and transmitting over the computer communications network to the initial better the contemporaneous image indicating physical possession of the physical wager.

15. A computer program product for wager registration for aftermarket brokered wagers, the computer program product including a non-transitory computer readable storage medium having program instructions embodied therewith, the program instructions executable by a device to cause the device to perform a method including:
- receiving from an initial bettor in an aftermarket brokered wager computing system, from over a computer communications network, a digital image of a physical wager established with a purveyor of wagers independent of the aftermarket brokered wager computing system;
- validating an authenticity of the digital image and responsive to the validation, writing a record to a registry in the aftermarket brokered wager computing system indicating one hundred percent (100%) ownership of the wager by the bettor at an amount and odds indicated by the image;
- confirming the record in the registry upon receipt of the physical wager; and,
- subsequently updating the record in the registry to indicate only a fractional ownership of the wager responsive to a third-party aftermarket buyer purchasing a fractional less than 100% share of the wager.

16. The computer program product of claim 15, wherein validating the authenticity of the digital image comprises recognizing an indicator within the digital image, transmitting a textual form of the indicator over the computer communications network to a validation service of the purveyor of wagers and receiving from the validation service, an indication of authenticity of the digital image.

17. The computer program product of claim 15, wherein validating the authenticity of the digital image comprises detecting a watermark of the purveyor of wagers within the digital image.

18. The computer program product of claim 15, wherein confirming the record upon receipt of the physical wager comprises acquiring a contemporaneous image of the received physical wager, and comparing the contemporaneous image with the digital image received from the bettor to confirm that the digital image received from the bettor is an image of the received physical wager.

19. The computer program product of claim 15, wherein the method further comprises publishing to a Web site, each written record indicating one hundred percent (100%) ownership of a corresponding wager.

20. The computer program product of claim 16, wherein the method further comprises acquiring a contemporaneous image of the received physical wager, and transmitting over the computer communications network to the validation service the contemporaneous image indicating physical possession of the physical wager.

21. The computer program product of claim 16, wherein the method further comprises acquiring a contemporaneous image of the received physical wager, and transmitting over the computer communications network to the initial better the contemporaneous image indicating physical possession of the physical wager.

* * * * *